United States Patent Office 3,528,832
Patented Sept. 15, 1970

3,528,832
ADDITIVES FOR MORTAR AND CONCRETE
Bernt Sture Jörgen Ericsson and Ulf Palm, Ornskoldsvik, Sweden, assignors to Mo och Domsjo Aktiebolag, Ornskoldsvik, Sweden, a corporation of Sweden
No Drawing. Filed Nov. 25, 1966, Ser. No. 596,771
Claims priority, application Sweden, Dec. 1, 1965, 15,580/65
Int. Cl. C04b 13/24
U.S. Cl. 106—93
17 Claims

ABSTRACT OF THE DISCLOSURE

A set-retardant composition is provided for retarding the setting of inorganic binders with water, comprising a water-soluble nonionic cellulose ether and a water-soluble salt of gluconic acid. An inorganic binder composition is also provided having an inorganic filler and the above set-retardant composition, together with a process for the slow controlled setting of an inorganic binder with water employing such a set-retardant composition.

---

The present invention relates to a set retarding admixture and additive for inorganic binders comprising a water-soluble nonionic cellulose ether and a water-soluble salt of gluconic acid, to combinations of the additive with an inorganic binder and/or inorganic filler, with or without water, and to a process for preparing the same.

It is often desirable to retard the setting time of inorganic binders contained in mortar, concrete or other binder compositions. This is particularly the case with mortar or concrete, which must not set during long journeys to the site where it is to be used. For certain fields of use, such as grouting around a reinforcement, for example, for dam constructions, bridge vaults, buildings etc., it is also desirable to extend the setting time, so as to obtain a greater time margin for placing, vibrating and treating the surface of the mortar or concrete. Furthermore, by extending the setting time, formation of so-called cold joints, which originate from casting fresh concrete on previously set concrete and which lower the strength of the finished concrete structure, are avoided. By extending the setting time, it is also possible to delay and extend the development of heat in mortar and concrete during a prolonged time, which is particularly desirable when preparing heavy concrete structures, and to counteract the accelerating effect which warm weather, heated aggregate and hot water have on the setting process.

Set-retarding additives have been proposed, such as lignin sulfonates and different types of hydroxy carboxylic acids, but these can only be used to prolong the setting time for hydraulic cement of certain types, and are not effective with hydraulic lime, alone or in combination with cement, or with non-hydraulic hydrated lime (quick lime). Moreover, if too much additive is used, the setting rate is increased instead of decreased, causing reduction in strength of the final material.

Cellulose derivatives such as hydroxyethyl cellulose, methyl cellulose, ethyl hydroxyethyl cellulose, carboxymethyl cellulose (CMC) or salts thereof have been proposed as additives in concrete, and give some extension of the setting time. However, in most cases they impart a reduced strength. The ionic cellulose ethers such as carboxymethyl cellulose have little retarding effect at normal pressures and temperatures. Furthermore, they are easily precipitated as insoluble calcium salts when an excess of lime is present, after which their effect is lost completely and the quality of the product is impaired instead of improved (U.S. Pat. No. 2,427,683).

In addition, divalent and tetravalent metal ions, other than calcium ions, present in the lime can precipitate insoluble carboxymethyl cellulose salts.

Japanese Pat. No. S–39–24896 (1964) published Nov. 5, 1964, discloses combinations of sodium carboxymethyl cellulose and gluconic acid, salts thereof, or gluconic acid lactone, for use in improving compression strength, bending strength, and flow properties of concrete and cement products, and also delaying the setting of these products. This composition has the disadvantages of the ionic cellulose ethers noted above. In addition, the patent teaches that where the sodium carboxymethyl cellulose is employed in a cement in an amount in excess of 0.2% by weight of cement, and the gluconic acid compound is employed in an amount in excess of 0.1% by weight, the properties of the cement tend to become inferior.

The present invention provides a set-retardant for inorganic binders, which even when used in large amounts, does not deleteriously affect the composition. The set-retardant according to the invention comprises a water-soluble nonionic cellulose ether and a water-soluble salt of gluconic acid. Not only does this composition extend the setting time of inorganic binders, but it also provides inorganic binder compositions such as mortar or concrete, with other advantageous properties such as good consistency, uniform density, reduced separation tendencies, controllable quantities of air, and a product having increased strength. The set-retardant according to this invention is capable when added in a sufficient amount of retarding the setting for at least 6 hours, thus meeting the Swedish test standards for set retarding agents.

In addition, in accordance with the present invention, a binder composition is provided comprising an inorganic binder, and the set retardant. This composition can be in solid particulate form, ready for mixing with an inorganic filler, if desired, and with water. The binder composition can also, of course, include an inorganic filler, so that it is ready for use upon addition of water thereto.

This invention further contemplates compositions comprising the set retardant and an inorganic filler. Such compositions also can be in solid particulate form, for mixing with an inorganic binder and with water, after which it is ready for use.

Furthermore in accordance withe the present invention, a process is provided for slow controlled setting of inorganic binders, which comprises setting the inorganic binder in the presence of water, a water-soluble nonionic cellulose ether, and a water-soluble salt of gluconic acid in a sufficient amount to slow the setting reaction.

Cellulose ethers alone improve workability and reduce water separation, but at the same time the binder becomes more sensitive to a large amount of the cellulose ether, due to the difficulty of controlling the air content. Salts of gluconic acid sometimes shorten or sometimes lengthen the setting time all depending on the amount used and the types of binders, but at the same time workability is impaired and water separation increases. It is therefore very surprising that a combination of a water-soluble nonionic cellulose ether and a water-soluble salt of gluconic acid, even in large quantities imparts complete control over the quantity of air in the composition containing the bnder and filler. Not only is strength of the final product not reduced; the strength is actually increased. By varying the amount of set retardant, the setting time of the inorganic binder can be controlled within wide limits, and the amount of air can be controlled as well.

The water-soluble nonionic cellulose ether can be any cellulose etherified with nonionic substituent groups to a degree of substitution such that the cellulose ether is soluble in water. Examples includes alkyl cellulose ethers, such as methyl cellulose, ethyl cellulose, methyl ethyl cellulose, methyl propyl cellulose, ethyl propyl cellulose, and propyl cellulose; hydroxy alkyl cellulose ethers, such as hydroxyethyl cellulose, hydroxpropyl cellulose, and hydroxyethyl hydroxypropyl cellulose; and alkyl hydroxyalkyl cellulose ethers, such as methyl hydroxyethyl cellulose, methyl hydroxypropyl cellulose, ethyl hydroxyethyl cellulose, propyl hydroxyethyl cellulose, and ethyl hydroxypropyl cellulose. The viscosity of the cellulose ether should be within the range from about 100 to about 50,000 cps., as measured in 2% aqueous solution at 20°, using a Brookfield viscometer, at 12 r.p.m.

The water-soluble salts of gluconic acid suitable for use in accordance with the present invention include alkali metal and alkaline earth metal salts of gluconic acid, such as sodium gluconate, potassium gluconate, calcium gluconate, ammonium gluconate; and organic salts, such as diethanolamine gluconate, triethanolamine gluconate, as well as glucono-δ-lactone, which readily hydrolyzes in water to form the acid. Gluconic acid also can be used.

The proportions of nonionic cellulose ethers and gluconic acid or acid salt are chosen to give the desired control of setting time. The amounts are not critical, since the salt combination is effective over a wide range of proportions, except to the extent that an unduly large proportion of either salt can lead to unacceptable strength reduction in the final product. Usually, an improvement in strength is obtained when the proportions of water-soluble nonionic cellulose ether and the water-soluble salt of gluconic acid are within the range from about 10 to about 40% by weight cellulose ether, and from about 60 to about 90% by weight of the salt of gluconic acid. Preferably from about 15 to about 35% by weight cellulose ether and from about 65 to about 85% by weight salt of gluconic acid, since these amounts give optimum retardation of setting time and optimum increase of strength.

The admixture or additive according to the invention can be employed with any inorganic binder, such as hydraulic lime, quick lime, hydraulic cement and mixtures of the same, and mixtures of hydraulic cement and lime. The hydraulic lime can be lime having a hydraulic modulus of at least 9, hardening both in air and under water according to the definition in, for example Bygg-AMA (Allmänna Material och Arbetsbeskrivningar) 1960, page 75 and ASTM designations C51, C5, C6, C10, C141, C206 and C207. The hydraulic cement can be as defined in Statliga Cement-bestämmelserna (governmental cement specifications) B1 1960 and ASTM designations C91, C150, C175, C205, C340 and C358.

The types of lime which are commonly used in Sweden are, for example, hydraulic lime from Svenska Skifferolje AB in Kvarntorp, called "Kvarntorps kraftkalk."

An example of hydrated quick lime without air-entraining agents to be employed with hydraulic cement in mortar compositions, is "Kronkalk T" from Karta-Oaxen. An exampleof such lime having such pore-forming agents is "Kalkhydrat 90" which is sold by Strabruken in Stockholm.

Commonly found hydraulic cements are natural cement, portland cement, alumina cement, slag cement, puzzolan cement, and the like. Among these cement materials, the rapidly binding types, alumina cement, are particularly difficult to retard, but the set-retardant of this invention has shown an extraordinarily good effect also with these cement types.

The inorganic filler material used in conjunction with the inorganic binder and/or set retardant of the invention can be any particulate inorganic material, such as natural sand, gravel, macadam, stone flour of various types, such as crushed granite, marble, dolomite, quartzite, or sandstone, and also pyrophyllite, vermiculite, kieselguhr and perlite.

The term "mortar" as used herein refers to a binder composition comprising a mixture of an inorganic binder as described above, and sand or other inorganic filler and water, for example according to ASTM designation C270.

The term "concrete" as used herein refers to a binder composition comprising a mixture of an inorganic binder as described above, an inorganic filler, such as crushed rock or gravel which is coarser than the filler used in mortar, and water, for example according to ASTM designation C94 and C387. The coarse filler used in concrete should have a particle size greater than about 8 mm.

The amount of set-retardant which should be admixed in the inorganic binder mix depends on how much the setting time is to be extended. The amount and substitution degree (viscosity) of the cellulose derivative used is also a factor. Very small amounts give an excellent retarding effect. Amounts within the range from about 0.1 to about 20.0 g. per kg. of the inorganic binding agent usually extend the setting time by from about 2 to about 36 hours. When employing the set-retardant with a hydraulic cement for example, in preparing the concrete, the amount should preferably be within the range from about 0.8 to about 2.5 g. per kg. cement. When employing the set-retardant with hydraulic lime or hydraulic lime and hydraulic cement, for example, when preparing mortar, the amount of set-retardant should preferably be within the range from about 1 to about 6 g. per kg. of the inorganic binder. When preparing mortars based on hydraulic cement and lime as binders, the amount of set-retardant should preferably be within the range from about 1 to about 12 g. per kg. inorganic binder.

A binder composition containing both the inorganic binder and the inorganic filler can contain from about 1 to about 99% inorganic binder and from about 1 to about 99% inorganic filler, based on the dry weight of the composition.

A filler composition will have enough set-retardant to provide the desired retarding effect when the filler is combined with an inorganic binder in appropriate proportions. In view of the proportions of filler to binder set out above, the set retardant will usually be used in an amount within the range from about 0.0001% to about 2% by weight of the filler composition.

The set retardant can be formulated as a simple mixture for subsequent incorporation in the inorganic binder and/or the inorganic filler. It can be introduced into the inorganic binder and/or inorganic filler in the form of an aqueous solution or a dry powder, in any mixing sequence. Furthermore, the additive can be formulated with the inorganic binder and/or inorganic filler and sold as a dry binder composition, ready for setting upon addition thereto of water, and a binder or filler, as may be necessary.

The effectiveness of the set-retardant according to the present invention is illustrated in the following examples, which represent preferred embodiments of the invention. Example 1 was carried out in accordance with Swedish government standard test and the results disclosed therein are test results from certificate No. U 64-2957, issued by the National Swedish Institute for Materials Testing.

EXAMPLE 1

Four types of concrete were manufactured with coarse sand (gravel) having a grain size of 0 to 32 mm. as aggregate material. The cement used was a mixed sample comprising equal portions of standard cement from three different manufacturers. The weight ratio between cement and gravel was 1:6.34. The set retardant was composed of 25% by weight ethyl hydroxyethyl cellulose, having a viscosity of 2500 cps. measured in a 2% aqueous solution, and 75% by weight sodium gluconate. It was added to the concrete mix at 0, 1.0, 2.0 and 2.5 g. per kg. cement.

The fresh concrete was tested with respect to consistency, air content, volumetric weight and hardening sequence. A Proctor needle was used to determine the hardening sequence, and the test was carried out according to ASTM-C-403. The hardening sequence was followed only until a penetration resistance of approximately 25 kg./cm.² had been reached.

The water and cement content were calculated from the bulk density and the weighed material amounts.

The consistency was determined according to Mohs method (Kungl. Byggnad sstyrelsens publication 1960:4, pp. 9–10); i.e. publication 1960:4, pp. 9–10 issued by the Ministry of Public Building and Works (U.S. General Services Administration), according to which an open cylinder connected at the bottom with a semi-cylinder was filled with the concrete mix being tested, and repeatedly struck with a constant force against a solid foundation. An exposition of the test results is found in Table I.

TABLE 1

| Constituents cement: filler | Cement content, kg./cm.³ | Set-retardant, g./kg. cement | Water cement, ratio | Consistency, moh units | Air content, percent | Weight by volume, kg./cm.³ | Setting time acc:ASTM C-403, hours | Compressive strength 28 calendar days | |
|---|---|---|---|---|---|---|---|---|---|
| | | | | | | | | kg./cm.² | percent |
| 1:6.34 | 300 | 0 | 0.572 | 15 | 1.3 | 2.41 | 5 | 415 | 100 |
| 1:6.34 | 299 | 1.0 | 0.565 | 15 | 2.5 | 2.39 | 10 | 436 | 105 |
| 1:6.34 | 299 | 2.0 | 0.551 | 17 | 2.8 | 2.38 | 19 | 476 | 115 |
| 1:6.34 | 300 | 2.5 | 0.542 | 16 | 2.9 | 2.40 | 31 | 518 | 124 |

As can be seen from Table I, the time taken for the concrete mix to set was increased by the set-retardant according to the invention. 2.5 g. additive per kg. cement gave six-fold increase of the setting time, in comparison with a concrete mass where no additive has been added. The compressive strength was at the same time increased by as much as 24%. The air content remained constant between 2.5 and 2.9% in the concrete mix which shows no detrimental effect on the air content.

EXAMPLES 2 TO 8

In these examples, three different set-retardants having the following compositions were used:

No. 1: 35% by weight methyl cellulose (viscosity 400 cps. in a 2% aqueous solution at 20° C.) 65% by weight sodium gluconate.

No. 2: 25% by weight ethyl hydroxyethyl cellulose (viscosity 2500 cps. in a 3% aqueous solution at 20° C.) 75% by weight sodium gluconate.

No. 3: 15% by weight hydroxyethyl cellulose (viscosity 31,000 cps. in a 2% aqueous solution at 20° C.) 85% by weight sodium gluconate.

These retardants were added to cement and lime mortar having the composition set out in Examples 2 to 8. In order to obtain a constant consistency, the amount of water was reduced when the amount of retardant was increased in the mortar. The amounts of additive and water added can be seen from the table immediately following each example. The amount of water is given in relation to the amount of binding agent, such as water cement number and water binding agent number. Also evident from the tables is the test data for the various cement and lime mortars. The setting time in all of the Examples 2 to 8 was determined in a Vicat apparatus according to ASTM C-191. The entire test was carried out according to Mortar Cement Standards in accordance with Kungl. Byggnadsstyrelsens publication 1960:4.

Example 2.—Cement mortar with following constituents:

1 part by weight Portland cement.

3 parts by weight sand having a grain size of from 0 to 4 mm.

TABLE II

| | Retardant, g./kg. inorganic binder | | Binding time | | Temperature during testing, ° C. | Strength after 28 calendar days, kg./cm.² | Air content fresh mortar, percent |
|---|---|---|---|---|---|---|---|
| | 2 | 3 | Hrs. | Mins. | | | |
| Water cement ratio: | | | | | | | |
| 0.50 | 0 | | 3 | | 22 | 346 | 6 |
| 0.48 | 2 | | 6 | 30 | 22 | 406 | 11 |
| 0.45 | 5 | | 7 | 50 | 22 | | 14 |
| 0.44 | 10 | | 16 | | 22 | | |
| 0.46 | | 5 | 5 | | 31 | | |

Example 3.—Lime mortar having following constituents:

1 part by volume hydraulic lime.
4 parts by volume sand with grain size of 0 to 4 mm.

TABLE III

| | Retardant, g. kg. inorganic binder | | | Stting time | | Temperature during testing, ° C. |
|---|---|---|---|---|---|---|
| | 1 | 2 | 3 | Hrs. | Mins. | |
| 1.30 | 0 | | | 5 | 50 | 25 |
| 1.28 | 4 | | | 10 | | 25 |
| 1.20 | 14 | | | 12 | 30 | 25 |
| 1.15 | 20 | | | 21 | | 25 |
| 1.29 | | | 4 | 12 | 30 | 30 |
| 1.28 | | | 4 | 7 | 30 | 31 |

Example 4.—Lime-cement having the following constituents:

2 parts by volume hydraulic lime.
1 part by volume Portland cement.
12 parts by volume sand having a grain size of from 0 to 4 mm.

TABLE IV

| | Retardant, g./kg. inorganic binder 2 | Setting time | | Temperature during testing, ° C. |
|---|---|---|---|---|
| | | Hrs. | Mins. | |
| Water lime ratio: | | | | |
| 0.95 | 0 | 3 | 25 | 25 |
| 0.93 | 2 | 5 | 04 | 25 |
| 0.90 | 4 | 7 | 30 | 25 |
| 0.85 | 6 | 10 | 30 | 25 |

Example 5.—Lime-cement mortar having following constituents:

3 parts by volume hydraulic lime.
1 part by volume portland cement.
16 parts by volume sand having a grain size of from 0 to 4 mm.

TABLE V

| Water binder ratio | Retardant, g./kg. inorganic binder 2 | Setting time | | Temperature during testing, ° C. | Compressive strength after 28 calendar days, kg./cm.² |
|---|---|---|---|---|---|
| | | Hrs. | Mins. | | |
| 1.06 | 0 | 3 | | 25 | 20 |
| 1.05 | 1.6 | 5 | 35 | 25 | |
| 1.05 | 2.7 | 8 | 45 | 25 | |
| 1.03 | 5.3 | 10 | 20 | 25 | 45 |
| 1.00 | 8.0 | 12 | 30 | 25 | |

Example 6.—Lime-cement mortar having the following constituents:

1 part by volume quick lime.
4 parts by volume portland cement.
20 parts by volume sand having a grain size of from 0 to 4 mm.

TABLE VI

| Water lime ratio: | Retardant, g./kg. inorganic binder 2 | Setting time Hrs. | Setting time Mins. | Temperature during testing, °C. |
|---|---|---|---|---|
| 1.00 | 0 | 3 | 10 | 25 |
| 0.93 | 3 | 6 | 50 | 25 |
| 0.82 | 9 | 12 | 45 | 25 |
| 0.75 | 14 | 21 | | 25 |

Example 7.—Lime-cement mortar having the following constituents:

2 parts by volume quick lime.
1 part by volume portland cement.
12 parts by volume sand having a grain size of from 0 to 4 mm.

TABLE VII

| Water binder ratio | Retardant, g./kg. inorganic binder 1 | Retardant, g./kg. inorganic binder 2 | Retardant, g./kg. inorganic binder 3 | Setting time Hours | Setting time Mins. | Temperature during testing, °C. | Compressive strength after 28 calendar days, kg./cm.² | Air content of fresh mortar, percent |
|---|---|---|---|---|---|---|---|---|
| 1.14 | | 0 | | 3 | 40 | 25 | 74 | 7 |
| 1.12 | | 3 | | 5 | | 25 | | |
| 1.09 | | 9 | | 9 | | 28 | | 11 |
| 1.08 | | 11 | | 16 | 5 | 28 | | 12 |
| 1.11 | 6 | | | 30 | 30 | 30 | 92 | |
| 1.10 | | | 6 | 6 | 20 | 30 | | |

Example 8.—Lime-cement mortar having the following constituents:

1 part by volume quick lime.
1 part by volume portland cement.
8 parts by volume sand having grain size of from 0 to 4 mm.

TABLE VIII

| Water inorganic binder ratio | Retardant, g./kg. inorganic binder material 2 | Setting time Hours | Setting time Mins. | Temperature during testing, °C. | Compressive strength 28 calendar days, kg./cm.² |
|---|---|---|---|---|---|
| 1.10 | 0 | 2 | 55 | 27 | 148 |
| 1.07 | 3 | 5 | 35 | 27 | |
| 1.05 | 6 | 7 | 40 | 27 | 161 |
| 1.03 | 9 | 9 | 55 | 27 | |

As can be seen from the examples, the desired extension of the setting time at varying time periods was obtained without any undesirable acceleration in setting, despite the fact that in a number of cases rather large amounts of retardant were used. In all examples, the mortar obtained was of good consistency, without any separation tendency. The strength, furthermore, was increased and the air content controlled.

EXAMPLES 9 TO 12

Examples 9 to 12 illustrate the synergistic effect obtained by means of the retardants of this invention. Example 9 shows the effect in an ordinary cement mortar, Example 10, a lime-cement mortar substantially for outdoor use and Example 12, a rapidly setting alumina cement mortar.

Example 9.—Composition: Part by weight
Portland cement (from Hellekis, Sweden) _____ 1
Sand, partcle size 0 to 4 mm. _____ 3

Inasmuch as a retardant may have different effects on portland cements manufactured at different places, a control was made with a mixture of equal parts of cement from Limhamn, Stora Vika and Gullhogen, Sweden.

TABLE IX

| Cement | Retardant, g./kg. cement Sodium gluconate | Retardant, g./kg. cement Ethyl hydroxyethyl cellulose (visc. 2,500 cp.) | Setting time Hrs. | Setting time Mins. | Compressive strength after 28 days, kg./cm.² |
|---|---|---|---|---|---|
| Hellekis | | | 3 | | 300 |
| Do | 1.5 | | | 25 | 335 |
| Do | | 0.5 | 3 | 25 | 205 |
| Do | 1.5 | 0.5 | 6 | 30 | 406 |
| Cement mixture | | | 4 | 30 | |
| Do | 1.5 | | 1 | | |

The tests show that addition of sodium gluconate alone accelerated the setting of the Hellekis portland cement as well as the above portland cement mixture, instead or retarding it. Sodium gluconate admixed in powdered form instead of as a solution gave a setting time of only 10 minutes in Hellekis cement, with an addition of 1.5 g. sodium gluconate per kg. cement.

The tests also show that addition of nonionic cellulose ether alone does not appreciably retard setting.

Addition of sodium gluconate in combination with a nonionic cellulose derivative in comparable amounts, results in a synergistic retardation of the setting process. It is also seen from the compressive strength values that nonionic cellulose ether alone reduced the compressive strength by about 33%, while the cellulose ether in combination with sodium gluconate increased compressive strength by about 33%.

Example 10.—Composition: Parts by weight
Portland cement (Hellekis) _____ 1
Quick lime _____ 2
Sand, particle size 0 to 4 mm. _____ 12

TABLE X

| Retardant, g. kg. cement Sodium gluconate | Retardant, g. kg. cement Ethyl hydroxyethyl-cellulose (visc. 2,500 cp.) | Setting time Hrs. | Setting time Mins. | Compressive strength after 28 days, kg. cm.² |
|---|---|---|---|---|
| | | 3 | 49 | 82 |
| 6.75 | | 5 | | 95 |
| | 2.25 | 5 | | 45 |
| 6.75 | 2.25 | 9 | | 92 |

The test shows that in a lime-containing cement mixture for indoor use, some extension of the setting time (2 hours) was obtained by adding sodium gluconate alone. Addition of nonionic cellulose ether alone resulted in a similar extension of the setting time, but also in a strongly reduced compressive strength. Addition of nonionic cellulose ether in combination with sodium gluconate resulted in a synergistic increase in setting time (increase of 5 hours 20 minutes) together with an increase in compressive strength.

Example 11.—Composition: Parts by volume
  Portland cement (Hellekis) _____ 1
  Quick lime _____ 1
  Sand, particle size 0 to 4 mm. _____ 8

TABLE XI

| Retardant, g. kg. cement | | Setting time | | Compressive strength after 28 days, kg. cm.² |
|---|---|---|---|---|
| Sodium gluconate | Ethyl hydroxyethylcellulose (visc. 2,500 cp.) | Hrs. | Mins. | |
| | | 2 | 55 | 149 |
| 4.5 | 0 | 4 | ------ | 166 |
| | 1.5 | 3 | 40 | 101 |
| 4.5 | 1.5 | 7 | 40 | 161 |

The test shows that in a lime-containing cement mixture for outdoor use some extension of the setting time (1 hour 5 minutes) was obtained by adding sodium gluconate alone. Addition of nonionic cellulose ether alone provided a similar extension of the setting time, but also a markedly reduced compressive strength. Addition of nonionic cellulose ether in combination with sodium gluconate resulted in a synergistic increase in setting time (an increase of 4 hours 45 minutes) and an increase in compressive strength.

Example 12.—Composition: Parts by weight
  Alumina cement _____ 1
  Sand, particle size 0 to 4 mm. _____ 3

TABLE XII

| Retardant, g./kg. cement | | Setting time | |
|---|---|---|---|
| Sodium gluconate | Ethyl hydroxyethylcellulose (visc. 2,500 cp.) | Hours | Mins. |
| | | 1 | 30 |
| 1.5 | | 1 | 30 |
| | 0.5 | 1 | 30 |
| 1.5 | 0.5 | 3 | ------ |

The test shows that the setting time of a rapidly setting cement, such as alumina cement, is not influenced at all by additions of sodium gluconate or nonionic cellulose ether separately. However, if sodium gluconate is added together with a nonionic cellulose ether in accordance with this invention, the setting time is, surprisingly, doubled.

Having regard to the foregoing disclosure, the following is claimed as the inventive and patentable embodiments thereof:

1. A set-retardant composition for retarding the setting of inorganic binders selected from the group consisting of hydraulic lime, quick lime, hydraulic cement and mixtures thereof, and mixtures of hydraulic cement and lime with water, without loss in strength in the final product, which comprises in combination, a water-soluble nonionic cellulose ether in an amount within the range of from about 10 to about 40% by weight, and a water-soluble salt of gluconic acid in an amount within the range from about 60 to about 90% by weight.

2. A set-retardant composition in accordance with claim 1, wherein the cellulose ether is ethyl hydroxyethyl cellulose.

3. A set-retardant composition in accordance with claim 1, wherein the cellulose ether is methyl cellulose.

4. A set-retardant composition in accordance with claim 1, wherein the cellulose ether is hydroxyethyl cellulose.

5. A set-retardant composition in accordance with claim 1, wherein the gluconic acid salt is an alkali metal gluconate.

6. A set-retardant composition in accordance with claim 1, wherein the cellulose ether is ethyl hydroxyethyl cellulose and the gluconic acid salt is sodium gluconate.

7. An inorganic filler composition for retarding the setting of inorganic binders selected from the group consisting of hydraulic lime, quick lime, hydraulic cement and mixtures thereof, and mixtures of hydraulic cement and lime with water, comprising an inorganic filler and a set-retardant composition in accordance with claim 1 in an amount from about 0.0001 to about 2% by weight of the composition.

8. A composition in accordance with claim 7 wherein the inorganic filler is sand.

9. An inorganic binder having a prolonged setting time and ready for setting upon addition of water thereto, comprising from about 1 to about 99% of an inorganic binder, selected from the group consisting of hydraulic lime, quick lime, hydraulic cement and mixtures thereof, and mixtures of hydraulic cement and lime, from about 1% to about 99% of an inorganic filler and a set-retardant composition in accordance with claim 1 in an amount within the range of from about 0.1 to about 20 g. per kg. of inorganic binder.

10. An inorganic binder composition having a prolonged setting time, comprising an inorganic binder selected from the group consisting of hydraulic lime, quick lime, hydraulic cement and mixtures thereof, and mixtures of hydraulic cement and lime, and a set-retardant composition in accordance with claim 1 in an amount within the range of from about 0.1 to about 20 g. per kg. of inorganic binder.

11. A binder composition in accordance with claim 10 wherein the inorganic binder is selected from the group consisting of hydraulic lime, quick lime, hydraulic cement, mixtures of hydraulic cement and hydraulic lime, and mixtures of hydraulic cement and lime.

12. A binder composition in accordance with claim 10 wherein the inorganic binder is hydraulic cement.

13. An inorganic binder composition having a prolonged setting time, comprising from about 1% to about 99% of an inorganic binder selected from the group consisting of hydraulic lime, quick lime, hydraulic cement and mixtures thereof, and mixtures of hydraulic cement and lime, from about 1% to about 99% of an inorganic filler, water, and a set-retardant composition in accordance with claim 1 in an amount within the range of from about 0.1 to about 20.0 g. per kg. of inorganic binder.

14. A mortar composition in accordance with claim 13, wherein the inorganic binder is selected from the group consisting of hydraulic lime, quick lime, mixtures of hydraulic cement and hydraulic lime, and mixtures of hydraulic cement and lime, and the inorganic filler is sand.

15. A concrete composition in accordance with claim 13 wherein the inorganic binder is hydraulic cement, and the inorganic filler is selected from the group consisting of coarse sand, gravel, crushed stone and crushed rock.

16. A process for the slow controlled setting of an inorganic binder selected from the group consisting of hydraulic lime, quick lime, hydraulic cement and mixtures thereof, and mixtures of hydraulic cement and lime with water, comprising setting the inorganic binder in the presence of water, an inorganic filler, and a set-retardant composition in accordance with claim 1 in an amount within the range of from about 0.1 to about 20.0 g. per kg. of inorganic binder, sufficient to slow the setting reaction.

17. A cementitious composition comprising a hydraulic cement, and a set retardant composition which consists of hydroxyethyl cellulose in an amount within the range of from about 10 to about 40% by weight, and a water-soluble alkali metal salt of gluconic acid in an amount within the range from about 60 to about 90% by weight, said retardant being present in an amount within the range of from about 0.1 to about 20 g./kg. of hydraulic cement.

References Cited

UNITED STATES PATENTS

| | | | |
|---|---|---|---|
| 3,351,478 | 11/1967 | Dodson et al. | 106—90 |
| 3,053,673 | 9/1962 | Walker | 106—90 |
| 2,819,171 | 1/1958 | Scripture et al. | 106—90 |
| 2,580,565 | 1/1952 | Ludwig | 106—93 |

HELEN M. McCARTHY, Primary Examiner

W. T. SCOTT, Assistant Examiner

U.S. Cl. X.R.

106—95, 97, 119, 315

UNITED STATES PATENT OFFICE
CERTIFICATE OF CORRECTION

Patent No. 3,528,832          Dated September 15, 1970

Inventor(s) Bernt Sture Jörgen Ericsson et al.

It is certified that error appears in the above-identified patent and that said Letters Patent are hereby corrected as shown below:

Column 2, line 46, "withe" should read -- with --; line 64, "bnder" should read -- binder --. Column 3, line 4, "hydroxpropyl" should read -- hydroxypropyl --; line 57, after "example", please insert a space. Columns 5 and 6, Table I, column 2 thereof, in the heading, "$cm^3$" should read -- $m^3$ --; Table I, column 7 thereof, in the heading, "$cm^3$" should read -- $dm^3$ --. Column 6, Table III, over columns 5 and 6 thereof, in the heading, "Stting" should read -- Setting --; Table III, column 1 thereof, in the heading, please insert -- Water lime ratio --; Table IV, column 4 of the Table, line 2 thereof, "04" should read -- 40 --. Column 8, line 17, "or" should read -- of --; Table X, column 4 of the Table, line 1 thereof, "49" should read -- 40 --.

Signed and sealed this 1st day of December 1970.

(SEAL)
Attest:
EDWARD M. FLETCHER, JR.
Attesting Officer

WILLIAM E. SCHUYLER, JR.
Commissioner of Patents